United States Patent
Kosaka

(10) Patent No.: US 8,918,556 B2
(45) Date of Patent: Dec. 23, 2014

(54) INFORMATION-PROCESSING APPARATUS, INFORMATION-PROCESSING METHOD, AND PROGRAM

(75) Inventor: Hideo Kosaka, Kanagawa (JP)

(73) Assignee: Sony Corporation (JP)

(*) Notice: Subject to any disclaimer, the term of this patent is extended or adjusted under 35 U.S.C. 154(b) by 858 days.

(21) Appl. No.: 12/590,232

(22) Filed: Nov. 4, 2009

(65) Prior Publication Data

US 2010/0141387 A1 Jun. 10, 2010

(30) Foreign Application Priority Data

Dec. 4, 2008 (JP) ................................. P2008-309577

(51) Int. Cl.
*G06F 13/00* (2006.01)
*G06F 13/32* (2006.01)
*H04B 5/02* (2006.01)

(52) U.S. Cl.
CPC ........ *G06F 13/32* (2013.01); *H04B 5/02* (2013.01); Y02B 60/1228 (2013.01)
USPC ................. 710/34; 710/48; 710/106; 710/305

(58) Field of Classification Search
USPC .................. 710/105, 106, 110, 305, 260, 261, 710/33–35, 48
See application file for complete search history.

(56) References Cited

U.S. PATENT DOCUMENTS

| | | | |
|---|---|---|---|
| 5,551,068 A * | 8/1996 | Goldsmith et al. | 370/466 |
| 6,728,908 B1 * | 4/2004 | Fukuhara et al. | 714/48 |
| 6,799,233 B1 * | 9/2004 | Deshpande et al. | 710/110 |
| 7,133,947 B2 * | 11/2006 | Tomitsuka et al. | 710/106 |
| 7,706,309 B2 * | 4/2010 | Shibata et al. | 370/282 |
| 2005/0165989 A1 * | 7/2005 | Kim | 710/260 |
| 2006/0255131 A1 * | 11/2006 | Stewart | 235/383 |
| 2007/0018794 A1 * | 1/2007 | Bares et al. | 340/10.3 |
| 2008/0143487 A1 | 6/2008 | Hulvey | |
| 2008/0258919 A1 * | 10/2008 | Suzuki | 340/572.1 |
| 2009/0024781 A1 * | 1/2009 | Heizmann | 710/305 |
| 2009/0033493 A1 * | 2/2009 | Lin et al. | 340/572.1 |
| 2009/0259786 A1 * | 10/2009 | Lin et al. | 710/110 |
| 2010/0182133 A1 * | 7/2010 | Ando | 340/10.51 |
| 2010/0277318 A1 * | 11/2010 | Maltseff | 340/572.1 |
| 2011/0197009 A1 * | 8/2011 | Agrawal | 710/305 |

FOREIGN PATENT DOCUMENTS

| | | | |
|---|---|---|---|
| JP | 61020182 A | 1/1986 |
| JP | 03278157 A | 12/1991 |
| JP | 05108561 A | 4/1993 |
| JP | 05265948 A | 10/1993 |

(Continued)

OTHER PUBLICATIONS

Partial European Search Report EP 09177809, dated Sep. 20, 2010.

(Continued)

*Primary Examiner* — Khanh Dang
(74) *Attorney, Agent, or Firm* — Lerner, David, Littenberg, Krumholz & Mentlik, LLP

(57) ABSTRACT

An information-processing method performed in an information-processing apparatus, the information-processing apparatus performing wireless communication with a first apparatus and wire communication with a second apparatus, the information-processing method including the steps of:
transmitting an interrupt signal to the second apparatus by using the wire communication when data is received from the first apparatus;
receiving, by using the wire communication, a clock signal from the second apparatus which receives the interrupt signal; and
transmitting and receiving, by using the wire communication, data between the information-processing apparatus and the second apparatus.

9 Claims, 9 Drawing Sheets

(56) References Cited

FOREIGN PATENT DOCUMENTS

| | | | |
|---|---|---|---|
| JP | 2001109973 A | 4/2001 | |
| JP | 2001-290764 A | 10/2001 | |
| JP | 2004005842 A | 1/2004 | |
| JP | 2004030758 A | 1/2004 | |
| JP | 2005128746 A | 5/2005 | |
| JP | 2006119693 A | 5/2006 | |
| JP | 2008186350 A | 8/2008 | |

OTHER PUBLICATIONS

"The I2C-Bus Specification" Philips Semiconductors,, [On line] no. Version 2.1, Jan. 1, 2000, pp. 1-46 XP002590803.

Office Action from Japanese Application No. 2008-309577, dated Sep. 13, 2012.

* cited by examiner

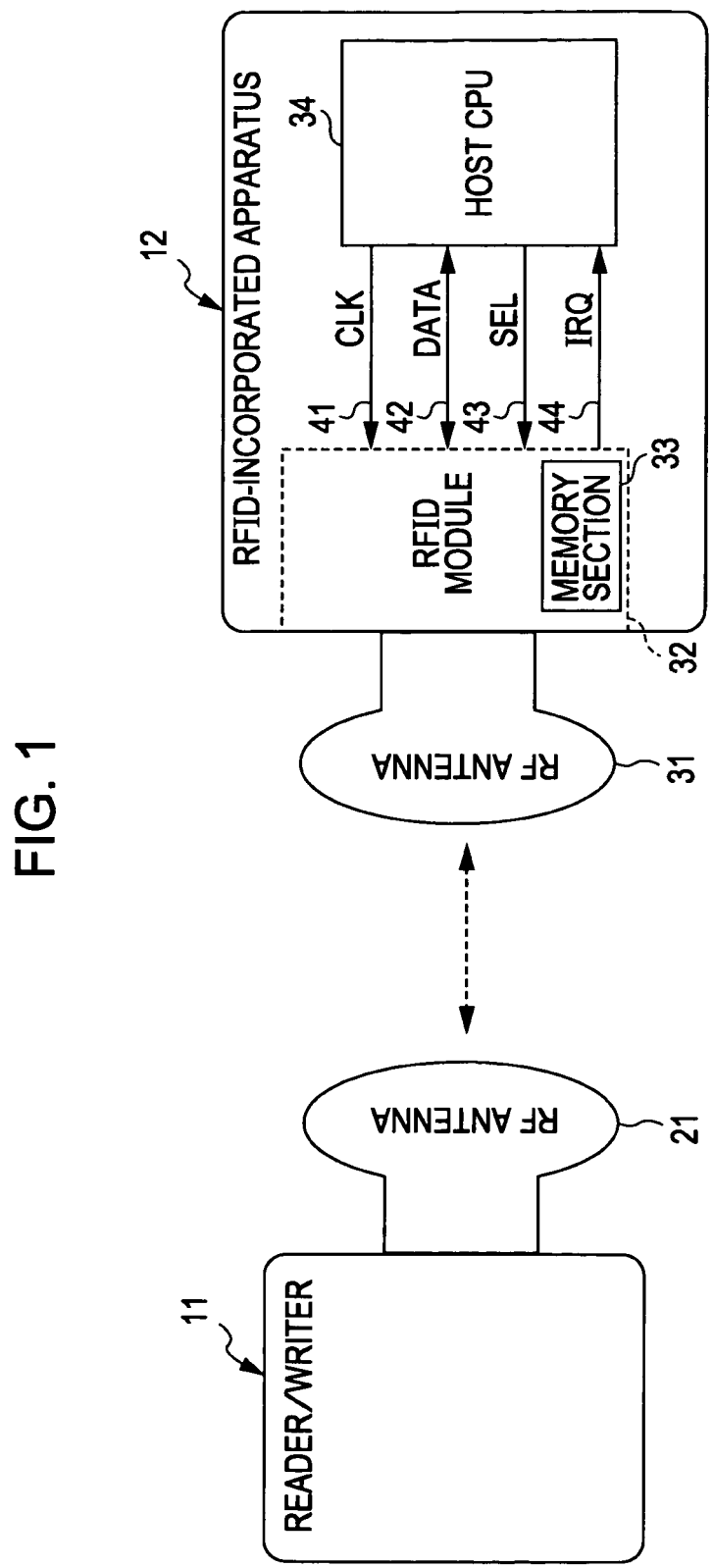

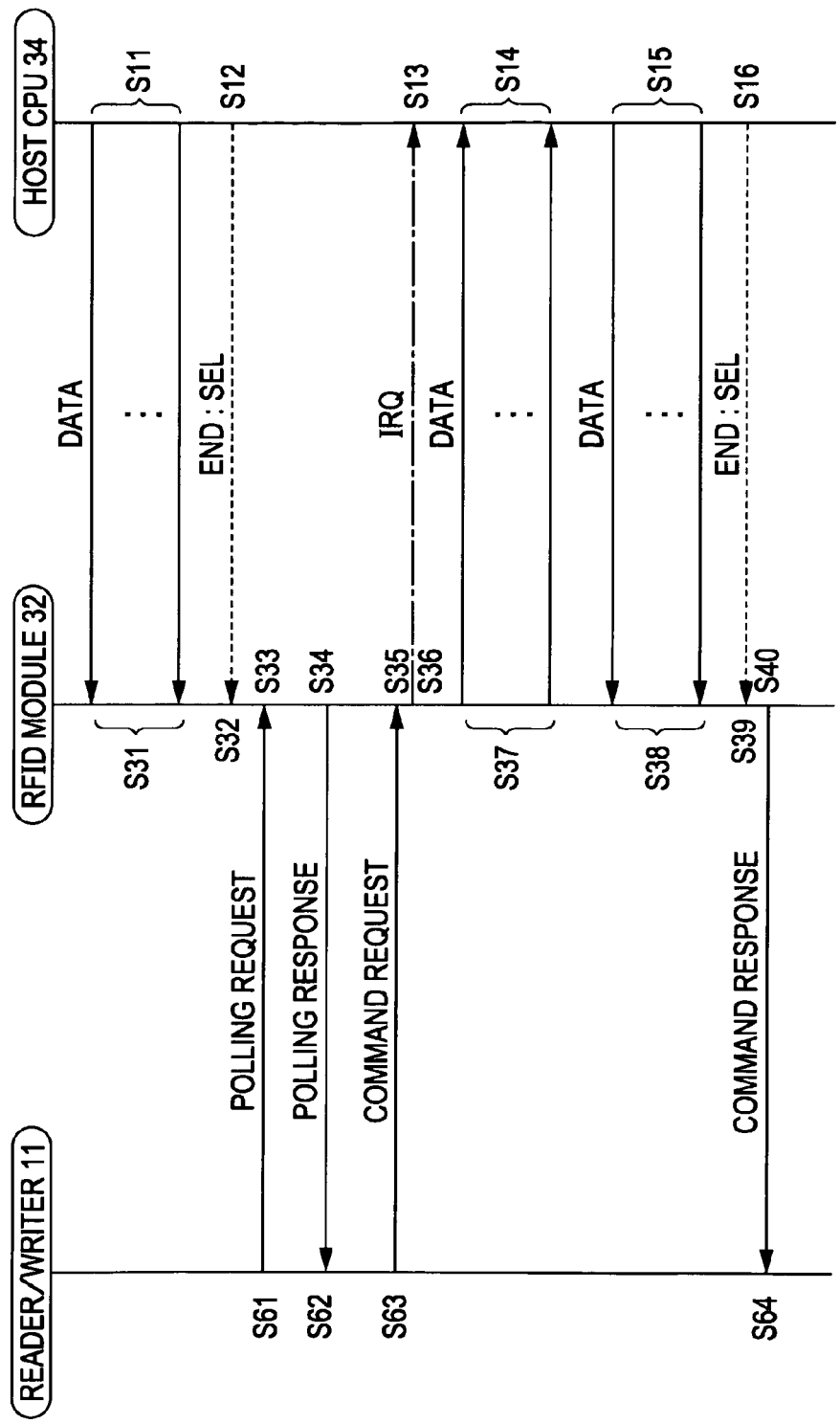

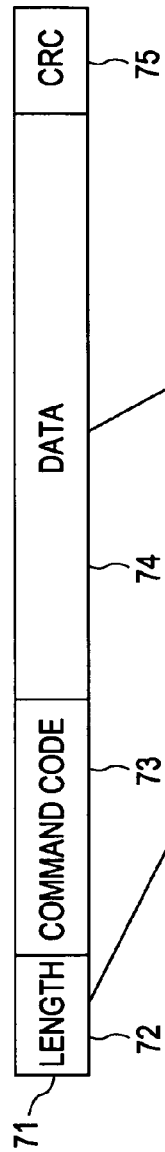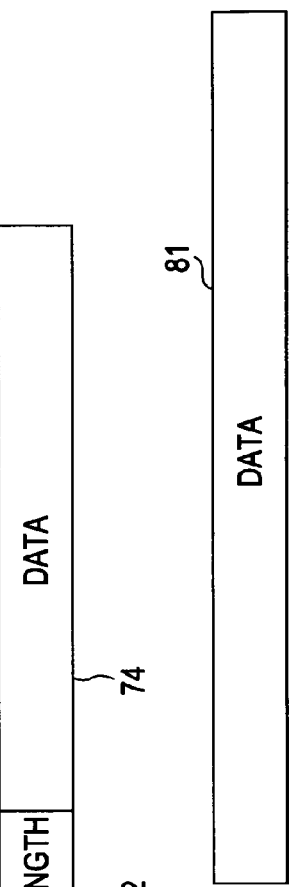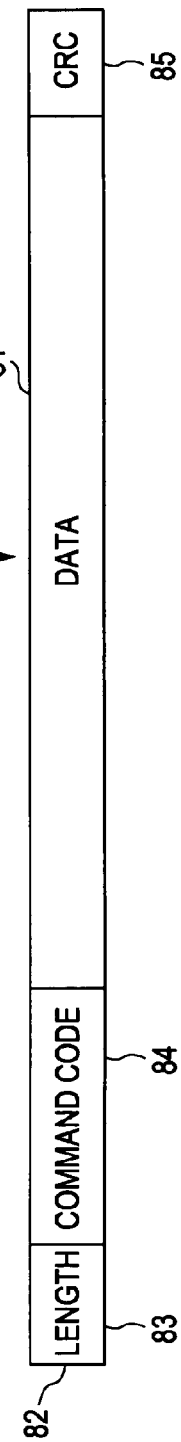

INFORMATION-PROCESSING APPARATUS, INFORMATION-PROCESSING METHOD, AND PROGRAM

CROSS-REFERENCE TO RELATED APPLICATION

The present application claims priority from Japanese Patent Application No. JP 2008-309577 filed in the Japanese Patent Office on Dec. 4, 2008, the entire content of which is incorporated herein by reference.

BACKGROUND OF THE INVENTION

1. Field of the Invention

The invention relates to an information-processing apparatus, an information-processing method, and a program. In addition, the invention relates to an information-processing apparatus using half-duplex communication, an information-processing method using half-duplex communication, and a program using half-duplex communication.

2. Description of the Related Art

Usually, apparatuses are connected to one another with a serial interface, and data is transmitted and received through the serial interface (see, for example, Japanese Unexamined Patent Application Publication No. 2001-290764).

SUMMARY OF THE INVENTION

Usually transmission and reception of command data is necessary when data is transmitted and received through a serial interface. In this case, since the data length of data to be transmitted and received increases with the data length of the command data, the data-transfer rate is deteriorated. In addition, a circuit or a program for analyzing (decoding) the command data may be necessary. It may be necessary for the circuit or the program to be provided in both a transmitting apparatus and a receiving one. Therefore, since the circuit sizes or the memory sizes of the transmitting apparatuses and the receiving ones increase with the size of a circuit or a program for generating and decoding a command, downsizing of the apparatuses and reduction of power consumption thereof are prevented.

In view of the above-identified circumstances, it is therefore desirable to omit transmission and reception of a command data, to decrease data length, and to reduce circuit size and power consumption. The omitted transmission and reception of a command data results in reduction of data length when transmission and reception of data is performed between apparatuses connected to one another. In addition, a circuit or a program for analyzing (decoding) the command data may be reduced when a command data is not transmitted and received.

According to an embodiment of the present invention, there is provided a first information-processing apparatus including:

communication means configured to communicate with a reader/writer;

a module configured to control the communication means;

a processing means configured to transmit and receive data to and from the module, respectively;

an interrupt-signal output means configured to output an interrupt signal from the module to the processing means when the communication receives data from the reader/writer;

a clock-signal output means configured to output a clock signal from the processing means to the module when the interrupt signal is received;

a data output means configured to output data, in synchronization with the clock signal, from the module to the processing means or from the processing means to the module; and a switching-signal output means through which the processing means outputs a switching signal used for switching the direction of data transmission and reception;

wherein the module outputs the interrupt signal, and transmits data-length data when the clock signal is received, the data-length data indicating the data length of data to transmit to the processing means; and the processing means counts the data length of data, the data being transmitted from the module by the data output means and received, after the data-length data indicating the data length is received, and determines the termination of data output from the module when the count value is equal to or greater than data length indicated by the data-length data.

According to the first information-processing apparatus, the first information-processing apparatus transmits an interrupt signal to an apparatus connected by using wire communication when data is received from another apparatus by using wireless communication. The apparatus receiving the interrupt signal supplies a clock signal. After that, the apparatus receiving the data length of data determines that data reception is terminated, when the data length of received data reaches the data length of data.

The data transmitted from the reader/writer includes a command, the module analyzes the command when data is received from the reader/writer with the communication means, and the interrupt-signal output means outputs the interrupt signal to the processing means in response to the analysis result of the command analyzed by the module.

According to an embodiment of the present invention, there is provided a second information-processing apparatus including:

a first line included in a predetermined interface and used for transmitting an interrupt signal to a second apparatus connected by using the interface when data is received from a first apparatus;

a second line included in the interface and used for receiving a clock signal from the second apparatus; and a third line included in the interface and used for transmitting and receiving data between the second information-processing apparatus and the second apparatus.

The data transmitted from the first apparatus includes a command, the command is analyzed when data is received from the first apparatus, and the interrupt signal is transmitted to the second apparatus in response to the analysis result of the command.

The clock signal is received from the second apparatus through the second line after the interrupt signal is transmitted to the second apparatus through the first line, and the data length of data is transmitted to the second apparatus through the third line after the clock signal is received, the data being transmitted to the second apparatus through the third line in synchronization with the clock signal.

The second information-processing apparatus further includes a fourth line included in the interface and used for receiving a signal which indicates whether data is transmitted to or received from the second apparatus.

On the basis of the changeover in the state of the signal transmitted through the fourth line, it is detected that data is transmitted from the second apparatus and it is detected that data transmission from the second apparatus is terminated.

According to an embodiment of the present invention, there is provided a recording medium storing a first computer readable program configured to cause an information-processing apparatus to execute processing, the information-processing apparatus performing wireless communication with a first apparatus and wire communication with a second apparatus, the computer readable program including the steps of:

transmitting an interrupt signal to the second apparatus by using the wire communication when data is received from the first apparatus;

receiving, by using the wire communication, a clock signal from the second apparatus when the interrupt signal is received; and transmitting and receiving, by using the wire communication, data between the information-processing apparatus and the second apparatus.

According to the second information-processing apparatus and the recording medium storing the first computer readable program, an interrupt signal is transmitted by using wire communication when data is received from another apparatus by using wireless communication. Then, in response to the transmitted interrupt signal, a clock signal is received.

According to an embodiment of the present invention, there is provided a third information-processing apparatus including:

a first line included in a predetermined interface and used for receiving an interrupt signal from a second apparatus connected by using the interface when the second apparatus receives data from a first apparatus;

a second line included in the interface and used for transmitting a clock signal to the second apparatus; and a third line included in the interface and used for transmitting and receiving data between the third information-processing apparatus and the second apparatus.

According to the third information-processing apparatus, the clock signal is transmitted to the second apparatus through the second line after the interrupt signal is received from the second apparatus through the first line;

data-length data indicating the data length of data is received from the second apparatus through the third line after the clock signal is transmitted, the latter data being transmitted from the second apparatus through the third line in synchronization with the clock signal; and the data length of data, the data being transmitted from the second apparatus, is counted after the data-length data is received, and the termination of data transmission from the second apparatus is determined when the count value is equal to or greater than data length indicated by the data-length data.

The third information-processing apparatus further includes a fourth line included in the interface and used for transmitting a signal to the second apparatus, the signal indicating whether data is transmitted to or received from the second apparatus.

On the basis of the changeover in the state of the signal transmitted through the fourth line, it is detected that data is transmitted to the second apparatus or data transmission thereto is terminated.

According to an embodiment of the present invention, there is provided a recording medium storing a second computer readable program configured to cause an information-processing apparatus to execute processing, the information-processing apparatus performing wireless communication with a first apparatus and wire communication with a second apparatus, the computer readable program including the steps of:

receiving an interrupt signal from the second apparatus by using the wire communication when the second apparatus receives data from the first apparatus;

transmitting, by using the wire communication, a clock signal to the second apparatus when the interrupt signal is received; and transmitting and receiving, by using the wire communication, data between the information-processing apparatus and the second apparatus.

According to the third information-processing apparatus and the recording medium storing the second computer readable program, an interrupt signal is received from the apparatus connected by using wire communication when data is received from another apparatus by using wireless communication. Then, in response to the received interrupt signal, a clock signal is transmitted.

BRIEF DESCRIPTION OF THE DRAWINGS

FIG. 1 is a diagram illustrating a configuration example of a system according to an embodiment of the present invention;

FIG. 2 is a diagram illustrating the operation of the system;

FIGS. 3A to 3D are diagrams illustrating data structure;

DESCRIPTION OF THE PREFERRED EMBODIMENTS

Figure 4:
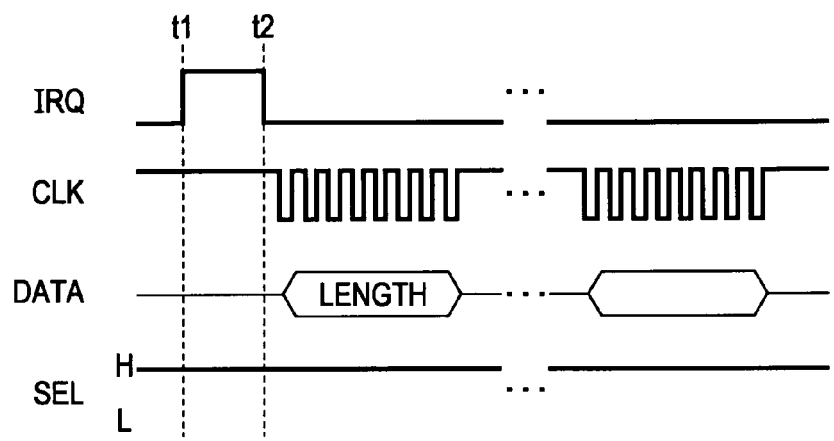
FIG. 4 is a diagram illustrating timing of data transmission and reception.

Hereinafter, preferred embodiments of the present invention will be described with reference to figures.

System Configuration

FIG. 1 is a diagram showing a configuration of a system according to an embodiment of the present invention. The system shown in FIG. 1 includes a reader/writer 11 and an RFID-incorporated apparatus 12. RFID is an abbreviation of "Radio Frequency Identification". In RFID, by using near-field wireless communication based on electromagnetic fields or radio waves, information is transmitted to and received from a tag embedded with ID information.

The reader/writer 11 includes an RF antenna 21, and the RFID-incorporated apparatus 12 includes an RF antenna 31. The reader/writer 11 and the RFID-incorporated apparatus 12 communicate with each other by using the RF antenna 21 and the RF antenna 31.

The RFID-incorporated apparatus 12 includes an RFID module 32 and a host CPU (Central Processing Unit) 34. The RFID module 32 controls communication with the reader/writer through the RF antenna 31. Then, the RFID module 32 communicates with the host CPU 34. In addition, the RFID module 32 includes a memory section 33 such as a RAM (Random Access Memory), a register, or a nonvolatile memory. Then, the RFID module 32 temporarily stores data, transmitted from the reader/writer 11 or the host CPU 34, in the memory section 33.

The RFID module 32 and the host CPU 34 are connected to each other by using wire communication configured to include four lines. First, the wire communication includes a CLK line 41 used for supplying a clock signal from the host CPU 34 to the RFID module 32 and an interactive DATA line 42 used for transmitting and receiving data between the RFID module 32 and the host CPU 34. In addition, the wire communication includes a SEL line 43 used for supplying, from the host CPU 34 to the RFID module 32, an instruction expressing the direction of data transfer and an IRQ line 44 used for supplying, from the RFID module 32 to the host CPU 34, an instruction expressing an interrupt.

However, while the RFID-incorporated apparatus 12 may include the RFID module 32 and the host CPU 34 as shown in FIG. 1, the RFID module 32 and the host CPU 34 may be separately provided. For example, the RFID module 32 and the host CPU 34 are connected to each other by using a predetermined interface, and the RFID module 32 is detachable from an apparatus including the host CPU 34.

In the case that the RFID module 32 is detachable, the apparatus, including the host CPU 34 and having no function to communicate with the reader/writer 11, can communicate with the reader/writer 11 when the RFID module 32 is attached to the apparatus, for example. In this way, data stored in the apparatus including the host CPU 34 can be supplied to the reader/writer 11 when the RFID module 32 is attached as necessary, for example.

As described below, the RFID-incorporated apparatus 12 including the RFID module 32 and the host CPU 34 as shown in FIG. 1 will be described as an example.

Process Relating to Data Transmission and Reception

In the system shown in FIG. 1, the reader/writer 11 and the RFID-incorporated apparatus 12 communicate with each other by using wireless communication, and the RFID module 32 and the host CPU 34 communicate with each other by using wire communication. An example of communication will be described with reference to FIG. 2. A process relating to communication will be briefly described with reference to FIG. 2 and, after that, be described in detail with reference to FIGS. 4 to 7.

In Step S11, data is transmitted from the host CPU 34 to the RFID module 32. For example, the data is initial data. Fractional amounts of the data divided by a predetermined unit are transmitted more than once. In Step S31, the RFID module 32 receives, more than once, data transmitted from the host CPU 34. The data is transmitted through the DATA line 42. Then, the data transmission starts when the host CPU 34 is ready.

When the host CPU 34 finishes transmitting data scheduled to be transmitted, the host CPU 34 sends a notice of data-transmission completion to the RFID module 32 through the SEL line 43. In Step S32, the RFID module 32 receives the notice of data-transmission completion from the host CPU 34. At this time, the RFID module 32 detects the rise of a SEL signal transmitted through the SEL line 43. In this way, data transmission from the host CPU 34 to the RFID module 32 is performed.

In Step S61, the reader/writer 11 sends a polling request. In the basic operation of the reader/writer 11, when, on the basis of the polling result, the reader/writer 11 detects an apparatus which is located near and capable of communicating, in this case, the RFID-incorporated apparatus 12, the reader/writer 11 starts communication with the detected apparatus.

The RFID module 32 included in the RFID-incorporated apparatus 12 receives the polling request from the reader/writer 11 in Step S33 and sends a polling response in Step S34. The reader/writer 11 receives the polling response in Step S62 and sends a command request in Step S63. In Step S35, the RFID module 32 receives the command request.

When the RFID module 32 receives the command request, the RFID module 32 stores a necessary portion of the received command request in the memory section 33, the portion including "Length" and "DATA". In this case, the "Length" refers to the data length of the "DATA", and the "DATA" refers to the main part of the data.

Then, in Step S36, the RFID module 32 sends a notice of data reception to the host CPU 34 through the IRQ line 44. Namely, the RFID module 32 sends an interrupt signal to the host CPU 34. After that, in Step S37, when the host CPU 34 is ready, the RFID module 32 reads out the "Length" and the "DATA" from the memory section 33 in synchronization with the clock signal supplied by the host CPU through the CLK line 41. Then, the RFID module 32 transmits, more than once, fractional amounts of the data divided by a predetermined unit to the host CPU 34 through the DATA line 42.

In Step S14, the host CPU 34 receives the "Length" and the "DATA" transmitted more than once from the RFID module 32. Then, the transfer is terminated.

The command request transmitted from the reader/writer 11 in Step S63 (the command request received by the RFID module 32 in Step S35) and the data transmitted from the RFID module 32 to the host CPU 34 in Step S37 (the data received by the host CPU 34 from the RFID module 32 in Step S14) will be described with reference to FIGS. 3A to 3D.

A command request 71 includes data 72 indicating the "Length", data 73 including a command code, data 74 including the "DATA" as the main part of the data, and data 75 including CRC (Cyclic Redundancy Checking).

The command request 71 is transmitted and received between the reader/writer 11 and the RFID module 32. When the RFID module 32 receives the command request 71, the RFID module 32 analyzes a data portion including the data 73, that is, a command code. When, on the basis of an analysis result of the command code, it is determined that transmission of data 74 (DATA) to the host CPU 34 is necessary, the RFID module 32 transmits data as shown in FIG. 3B to the host CPU 34.

Namely, the data 72 and the data 74 are transmitted from the RFID module 32 to the host CPU 34. As described above, first in Step S37, the data 72, the "Length", indicating the data length of the data 74 is transmitted from the RFID module 32 to the host CPU 34. Then, the data 74, the main part of the data, is transmitted.

In this way, the data transmitted from the reader/writer 11 is data including a command. Then, the RFID module 32 analyzes the command included in the received data and transmits (transfers) the main part of the data to the host CPU 34 on the basis of the analysis result. Therefore, when, on the basis of the analysis result, it is determined that transmission of the main part of the data to the host CPU is not necessary, the main part of the data is not transferred to the host CPU 34, as the case may be. In this way, since the host CPU 34 avoids the analysis of the command included in the command request transmitted from the reader/writer 11, a circuit or a program used for the analysis may be reduced in size.

In addition, since the "Length" and the "DATA" are transferred except for the command, the data length of all data transferred is reduced. Therefore, when the transfer rate of a communication channel is low, the amount of time necessary for transmitting and receiving data is reduced. In addition, as described below, since the data 72, corresponding to the "Length", is transmitted and received, transmission of a command from the RFID module 32 to the host CPU 34 is avoided. This is the reason that transfer efficiency is increased.

As shown in FIG. 2, when the host CPU 34 sends, to the RFID module 32, a reply in response to a command response, the host CPU 34 switches the status of the SEL signal transmitted through the SEL line 43 from H (High) to L (Low) and switches the transfer direction of the DATA line 42 to a direction in which data is transferred from the host CPU 34 to the RFID module 32.

Then, in Step S15, data is transmitted from the host CPU 34 to the RFID module 32. When the host CPU 34 is ready, the host CPU 34 transmits data to the RFID module 32 through the DATA line 42, the transmission of data being more than once and in synchronization with the clock signal supplied by the host CPU through the CLK line 41. In Step S38, the RFID module 32 receives the data. The RFID module 32 stores the received data in the memory section 33 as necessary.

Then, when the transmission of data is terminated, the host CPU 34 switches the status of the SEL signal transmitted through the SEL line 43 from L (Low) to H (High) and sends a notice of data-transmission completion to the RFID module 32. In Step S39, the RFID module 32 receives the notice of data-transmission completion from the host CPU 34. At this time, the RFID module 32 detects the rise of the SEL signal transmitted through the SEL line 43. In this way, data transmission from the host CPU 34 to the RFID module 32 is performed.

When the RFID module 32 receives the notice of data-transmission completion, in Step S40 the RFID module 32 reads out the data stored in the memory section 33, adds necessary information to the data, and sends a command response (the read out data) to the reader/writer 11. In Step S64, the reader/writer 11 receives the command response from the RFID module 32.

The data transmitted from the host CPU 34 to the RFID module 32 in Step S15 (the data received by the RFID module 32 from the host CPU 34 in Step S38) and the command response transmitted from the RFID module 32 to the reader/writer 11 in Step S40 (the command response received by the reader/writer 11 from the RFID module 32 in Step S64) will be described with reference to FIGS. 3A to 3D.

As shown in FIG. 3C, the "DATA" which the host CPU 34 is scheduled to transmit to the RFID module 32 corresponds to data 81. Content which the host CPU 34 is scheduled to transmit to the reader/writer 11 as a command response is described in the data 81.

When the RFID module 32 receives the data 81, the RFID module 32 generates a command response 82 as shown in FIG. 3D and transmits the command response 82 to the reader/writer 11. Namely, the command request 82 includes data 83 indicating the "Length", data 84 including a command code, data 81 including the "DATA" as the main part of the data, and data 85 including CRC (Cyclic Redundancy Checking).

Namely, the RFID module 32 generates the command response 82 by adding, to the data 81, the data 83 corresponding to "Length", the data 84 including a command code, and the data 85 including CRC. The data 83 indicates the data length of the data 81, and the command code instructs the reader/writer 11 on the content of a process. The command response 82 is transmitted and received between the reader/writer 11 and the RFID module 32.

The data 81 may include the "Length". Namely, when the host CPU 34 supplies the data 81, the "Length" data included in the data 81 may be supplied to the RFID module 32. In this case, the "Length" data included in the data 81 may be extracted in the RFID module 32 and be supplied to the command response 82 as the data 83.

In this way, since the RFID module 32 adds a command code to the data 81 transmitted from the host CPU 34, the host CPU 34 does not recognize a command for the reader/writer 11. Therefore, a circuit or a program used for the recognition may be reduced in size.

Then, since data transmitted from the host CPU 34 to the RFID module 32 is only the data 81, the data length of all data transmitted is reduced. Therefore, when the transfer rate of a communication channel is low, the amount of time necessary for transmitting and receiving data is reduced.

Then, the communication between the reader/writer 11 and the RFID module 32 is performed by using wireless communication. Therefore, even though the communication channel is relatively unstable, data transmission and reception are correctly performed by adding the data 75 (the data 85) including CRC to data to transmit and receive. Compared with the wireless communication, the communication between the RFID module 32 and the host CPU 34 is performed by using wire communication. Therefore, since the communication channel is relatively stable, data transmission and reception are performed by adding no data including CRC. Even though data transmission and reception are accomplished during a relatively short period of time such as contact time in a system in which contactless communication is performed, data transmission and reception are robustly performed with the well-controlled communication mentioned above.

In this way, the communication between the reader/writer 11 and the RFID-incorporated apparatus 12 is performed. Then, in this way, the communication between the RFID module 32 and the host CPU 34 is performed. In addition, the communication between the RFID module 32 and the host CPU 34 will be further described.

As described below, four patterns may be applied to the communication between the RFID module 32 and the host CPU 34. Namely, in the first pattern, data transmission from the RFID module 32 to the host CPU 34 is performed and terminated. In the second pattern, data transmission from the host CPU 34 to the RFID module 32 is performed and terminated.

In the third pattern, data transmission from the RFID module 32 to the host CPU 34 is performed and, after that, data transmission from the host CPU 34 to the RFID module 32 is performed and terminated. In the fourth pattern, data transmission from the host CPU 34 to the RFID module 32 is performed and, after that, data transmission from the RFID module 32 to the host CPU 34 is performed and terminated. The four patterns will be described below.

First Pattern

The first pattern will be described with reference to FIG. 4. The first pattern is a process related to the communication between the RFID module 32 and the host CPU 34, in which data transmission from the RFID module 32 to the host CPU 34 is performed and terminated. For example, the communication is performed when a command request from the reader/writer 11 is received.

When the RFID module 32 receives, for example, a command request from the reader/writer 11 at timing t1, the RFID module 32 sends an IRQ signal to the host CPU 34 through the IRQ line 44. In this way, when the RFID module 32 is scheduled to supply data to the host CPU 34, the RFID module 32 sends the IRQ signal (an interrupt signal) to the host CPU 34 through the IRQ line 44.

If the host CPU 34 receives the IRQ signal, the host CPU 34 supplies a clock signal to the RFID module 32 through the CLK line 41 when, at timing t2, the host CPU 34 is ready for receiving the data. When the RFID module 32 receives the clock signal, the RFID module 32 transmits the data in synchronization with the clock signal.

The first data which the RFID module 32 sends to the host CPU 34 is "Length" indicating the data length of data. After the "Length" is transferred, data such as a command from the reader/writer 11 is transferred. Therefore, the "Length" indicates the data length of data transferred (transmitted) after the "Length".

By receiving the "Length", the host CPU recognizes the data length of the transferred data. Then, by recognizing the data length of the transferred data, the host CPU can determine whether or not data transfer is terminated. Namely, after receiving the "Length", the host CPU starts counting the data length of the transferred data (received data). Then, the host CPU detects the termination of data transfer when a count value corresponding to counted data length is equal to or greater than data length indicated by the "Length".

In this way, transmitting, from the RFID module 32 to the host CPU 34, a command indicating the termination of data transfer is avoided by detecting the termination of data transfer. Therefore, the data length of data used for transmitting the command is reduced. In addition, since a circuit or a program for generating or analyzing the command data may be unnecessary, the size of a circuit or memory size may be reduced. Therefore, reduction of power consumption may be realized.

When data is transmitted from the RFID module 32 to the host CPU 34 in this way, an H (High) state of a signal communicated through the SEL line 43 is retained. The signal communicated through the SEL line 43 has two states, H (High) and L (Low). The H (High) state of the signal communicated through the SEL line 43 indicates a state in which data is transmitted from the RFID module 32 to the host CPU 34. Then, the L (Low) state of the signal communicated through the SEL line 43 indicates a state in which data is transmitted from the host CPU 34 to the RFID module 32.

Namely, the signal communicated through the SEL line indicates the direction of data transmission. Then, the direction of data transmission in the communication between the RFID module 32 and the host CPU 34 is switched by switching the state of the signal communicated through the SEL line 43. In this case, in the H (High) state of the signal communicated through the SEL line 43, data is transmitted from the RFID module 32 to the host CPU 34, and in the L (Low) state of the signal communicated through the SEL line 43, data is transmitted from the host CPU 34 to the RFID module 32. Then, descriptions, as below, relating to data communication are based on the above condition. Instead, an opposite condition may be set up. The opposite condition is that data is transmitted from the RFID module 32 to the host CPU 34 in the L (Low) state of the SEL line 43 and data is transmitted from the host CPU 34 to the RFID module 32 in the H (High) state of the SEL line 43.

Second Pattern

Next, communication in the second pattern will be described with reference to FIG. 5. In the second pattern, data transmission from the host CPU 34 to the RFID module 32 is performed and terminated.

When the host CPU 34 is scheduled to transmit data to the RFID module 32 at timing t1, the host CPU 34 switches the state of the signal communicated through the SEL line 43 from H (high) to L (Low). Then, in this case, usually (in a standby state) the state of the SEL line 43 is set to the H (high) state. This is because the H (High) state means that data transmission from the RFID module 32 to the host CPU 34 can be performed and the host CPU 34 is maintained in a state in which an interrupt signal (IRQ signal) from the RFID module 32 can be received.

The host CPU 34 switches the state of the signal communicated through the SEL line 43 from H (High) to L (Low) and the RFID module 32 detects the switching of the state. Accordingly, the RFID module 32 detects scheduled data transmission from the host CPU 34. Then, the RFID module 32 transits to a state in which data from the host CPU 34 can be received.

When the host CPU 34 is ready after switching the state of the signal communicated through the SEL line 43 from H (High) to L (Low), the host CPU 34 transmits, to the RFID module 32, a clock signal through the CLK line 41 and data through the DATA line 42, the transmission of data being in synchronization with the clock signal. When data is transmitted from the host CPU 34 to the RFID module 32, data itself is transmitted from the beginning and no data indicating data length such as the "Length" is transmitted. This is because the termination of data transmission from the host CPU 34 is not determined in the RFID module 32.

Figure 5:
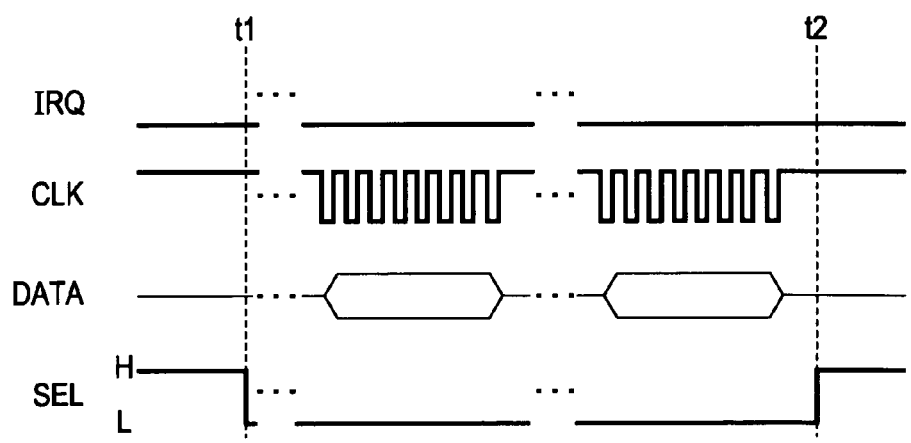
FIG. 5 is a diagram illustrating timing of data transmission and reception.

As shown in FIG. 5, this is because the host CPU 34 transmits data while counting data length of the data and switches the state of the signal communicated through the SEL line 43 from L (Low) to H (High) at timing t2 at which data transmission is terminated. When the state of the signal communicated through the SEL line 43 is switched from L (Low) to H (High), the RFID module 32 detects the switching of the state. Accordingly, the RFID module 32 detects the termination of data transmission from the host CPU 34.

In this way, when data is transmitted from the host CPU 34 to the RFID module 32, data such as the "Length" is not transmitted and received. Accordingly, data length of transmitted and received data can be reduced. In addition, according to an embodiment of the present invention, the RFID module 32 does not transmit and receive a command which is transmitted and received in the communication of the related art, when data transmission is started or terminated. Accordingly, since a circuit or a program for generating or analyzing the command data may be unnecessary for the RFID module 32, the size of a circuit or memory size may be reduced. Therefore, reduction of power consumption may be realized.

Third Pattern

Figure 6:
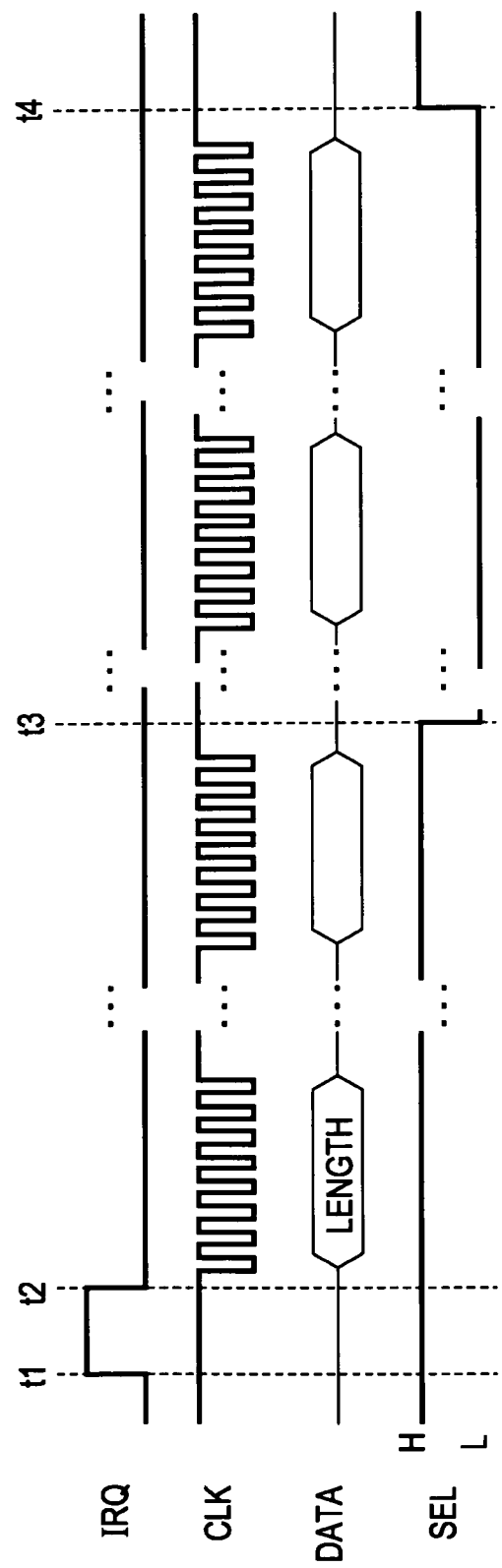
FIG. 6 is a diagram illustrating timing of data transmission and reception.

Next, communication in the third pattern will be described with reference to FIG. 6. In the third pattern, data transmission from the RFID module 32 to the host CPU 34 is performed, and, after that, data transmission from the host CPU 34 to the RFID module 32 is performed and terminated. In the communication in the third pattern, the communication in the first pattern and the communication in the second pattern are sequentially performed in this order. In addition, for example, the communication in the third pattern is performed when a command request is received from the reader/writer 11 and a command response is sent in response to the command request.

For example, when the RFID module 32 receives the command request from the reader/writer 11 at timing t1, the RFID module 32 stores a necessary portion of the received command request in the memory section 33, the portion including "Length" and "DATA". Then, the RFID module 32 transmits an IRQ signal to the host CPU 34 through the IRQ line 44. If the host CPU 34 receives the IRQ signal, the host CPU 34 supplies a clock signal to the RFID module 32 through the CLK line 41 when, at timing t2, the host CPU 34 is ready for receiving data. When the RFID module 32 receives the clock signal, the RFID module 32 transmits data, such as the "Length" indicating data length, to the host CPU 34 in synchronization with the clock signal.

When the host CPU 34 receives the "Length", the host CPU 34 recognizes the data length of transferred data and starts counting the data length of data transferred afterward (the data length of received data). Then, the host CPU detects the termination of data transfer when a count value corresponding to the counted data length is equal to data length indicated by the "Length". In response to the detection, the host CPU switches the state of a signal communicated through the SEL line 43 from H (High) to L (Low) at timing t3.

Then, when the host CPU 34 is ready after switching the state of the signal communicated through the SEL line 43 from H (High) to L (Low), the host CPU 34 transmits, to the RFID module 32, the clock signal through the CLK line 41 and data through the DATA line 42, the transmission of data being in synchronization with the clock signal. For example, the host CPU 34 arranges a reply (data) in response to the command, transferred from the RFID module 32, of the reader/writer 11. Then, when the host CPU 34 is ready for transmission, the host CPU 34 transmits the reply through the DATA line 42 in synchronization with the clock signal.

When the host CPU 34 terminates the data transmission at timing t4, the host CPU 34 returns the state of the signal communicated through the SEL line 43 from L (Low) to H (High). Accordingly, the RFID module 32 detects the termination of data transmission from the host CPU 34. After that, as necessary, the RFID module 32 adds necessary information to the data transmitted from the host CPU 34 and transmits a command response to the reader/writer 11.

Fourth Pattern

Figure 7:
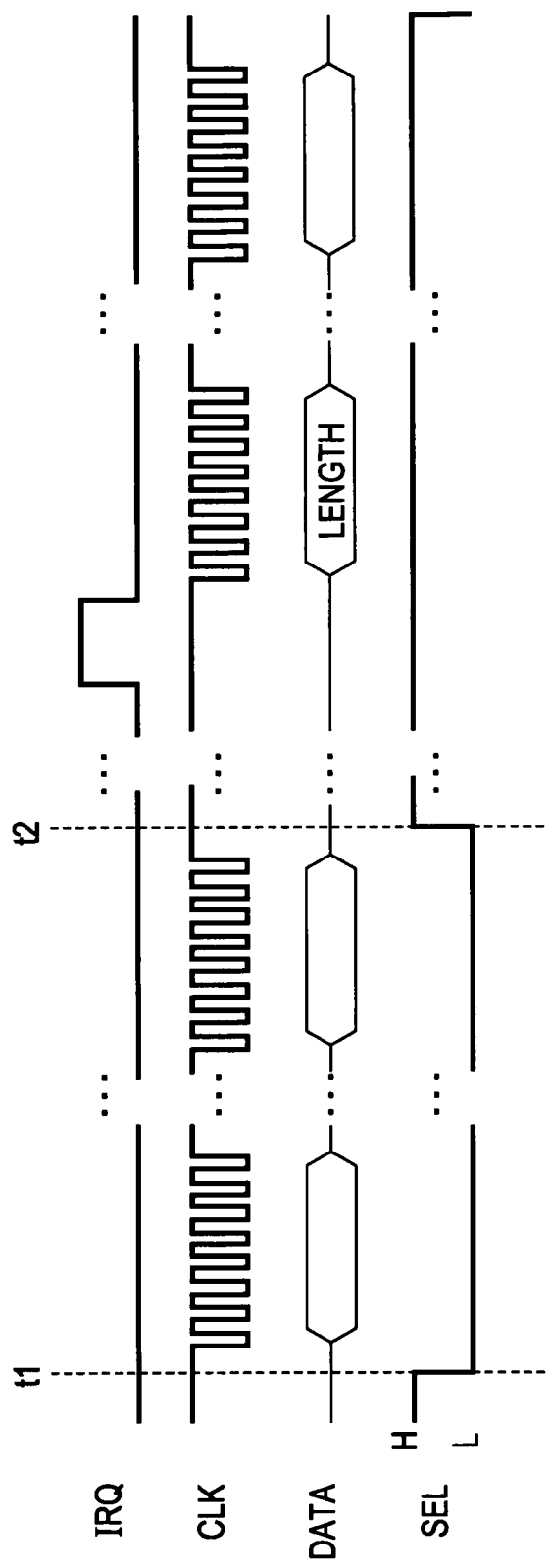
FIG. 7 is a diagram illustrating timing of data transmission and reception.

Next, communication in the fourth pattern will be described with reference to FIG. 7. In the fourth pattern, data transmission from the host CPU 34 to the RFID module 32 is performed, and, after that, data transmission from the RFID module 32 to the host CPU 34 is performed and terminated. In the communication in the fourth pattern, the communication in the second pattern and the communication in the first pattern are sequentially performed in this order.

When the host CPU 34 is scheduled to transmit data to the RFID module 32 at timing t1, the host CPU 34 switches the state of a signal communicated through the SEL line 43 from H (high) to L (Low). The RFID module 32 detects the switching of the state of the signal communicated through the SEL line 43. Accordingly, the RFID module 32 detects scheduled data transmission from the host CPU 34. Then, the RFID module 32 transits to a state in which data from the host CPU 34 can be received.

When the host CPU 34 is ready after switching the state of the signal communicated through the SEL line 43 from H (High) to L (Low), the host CPU 34 transmits, to the RFID module 32, a clock signal through the CLK line 41 and data through the DATA line 42, the transmission of data being in synchronization with the clock signal. When all data is transmitted, the host CPU 34 returns the state of the signal communicated through the SEL line 43 from L (Low) to H (High) at timing t2. Accordingly, the RFID module 32 detects the termination of data transmission from the host CPU 34.

When the RFID module 32 transmits data to the host CPU 34 at a time point later than the timing t2, the RFID module 32 sends an IRQ signal to the host CPU 34 through the IRQ line 44. If the host CPU 34 receives the IRQ signal, the host CPU 34 supplies the clock signal to the RFID module 32 through the CLK line 41 when the host CPU 34 is ready for receiving data. When the RFID module 32 receives the clock signal, the RFID module 32 outputs data in synchronization with the clock signal.

The RFID module 32 transmits data, such as "Length" indicating the data length of data, to the host CPU 34. Then, The RFID module 32 transmits data scheduled to be transmitted. After receiving the "Length", the host CPU starts counting the data length of the transmitted data (received data). Then, the host CPU detects the termination of data transfer when a count value corresponding to the counted data length is equal to or greater than data length indicated by the "Length". After detecting the termination of data transfer, the host CPU detects stops supplying the clock signal to the RFID module 32.

In this way, in any pattern, since the host CPU 34 controls the start and termination of communication, the RFID module 32 and the host CPU 34 avoid sending forth a command used for instructing the start and termination of communication. Therefore, data length may be reduced when a command data is omitted.

Namely, the start of communication is detected, if the host CPU 34 receives the IRQ signal or if the host CPU 34 switches the state of the signal communicated through the SEL line 43 from H (High) to L (Low) and supplies the clock signal through the CLK line 41. However, since the start of communication is not performed by transmission and reception of a command code, the omitted command data may result in reduction of data length.

Then, the termination of communication is detected, if the host CPU 34 determines the termination on the basis of the "Length" from the RFID module 32, the "Length" being data relating to data length, or if the host CPU 34 switches the state of the signal communicated through the SEL line 43 from L (Low) to H (High). However, since the termination of communication is not performed by transmission and reception of a command code, the omitted command data may result in reduction of data length.

In addition, since a command code is not used, a function for generating or analyzing the command code may be omitted. Accordingly, in the RFID module 32 and the host CPU 34, the size of a circuit or memory size may be reduced and reduction of power consumption may be realized.

Furthermore, the above-mentioned communication may be realized with no interface including an added signal line. Namely, the interrupt signal (IRQ signal) is used as a substitute for a signal line used for starting data transmission, the data-transmission-direction signal line (SEL line) is used as a substitute for a signal line used for terminating data transmission, and data length is appended to the leading portion of data transmitted from the RFID module (Slave) to the host CPU 34 (Master). The configuration realizes the above-mentioned communication. Therefore, a command code and decoding circuit used for analyzing the command code may be omitted with no signal line added to an interface. Therefore, according to an embodiment of the present invention, it may be expected that transfer efficiency is increased by reducing the amount of data, circuit size is reduced by reducing an encoding circuit and a decoding circuit or memory size, and power consumption is reduced.

Process in RFID Module 32

Figure 8:
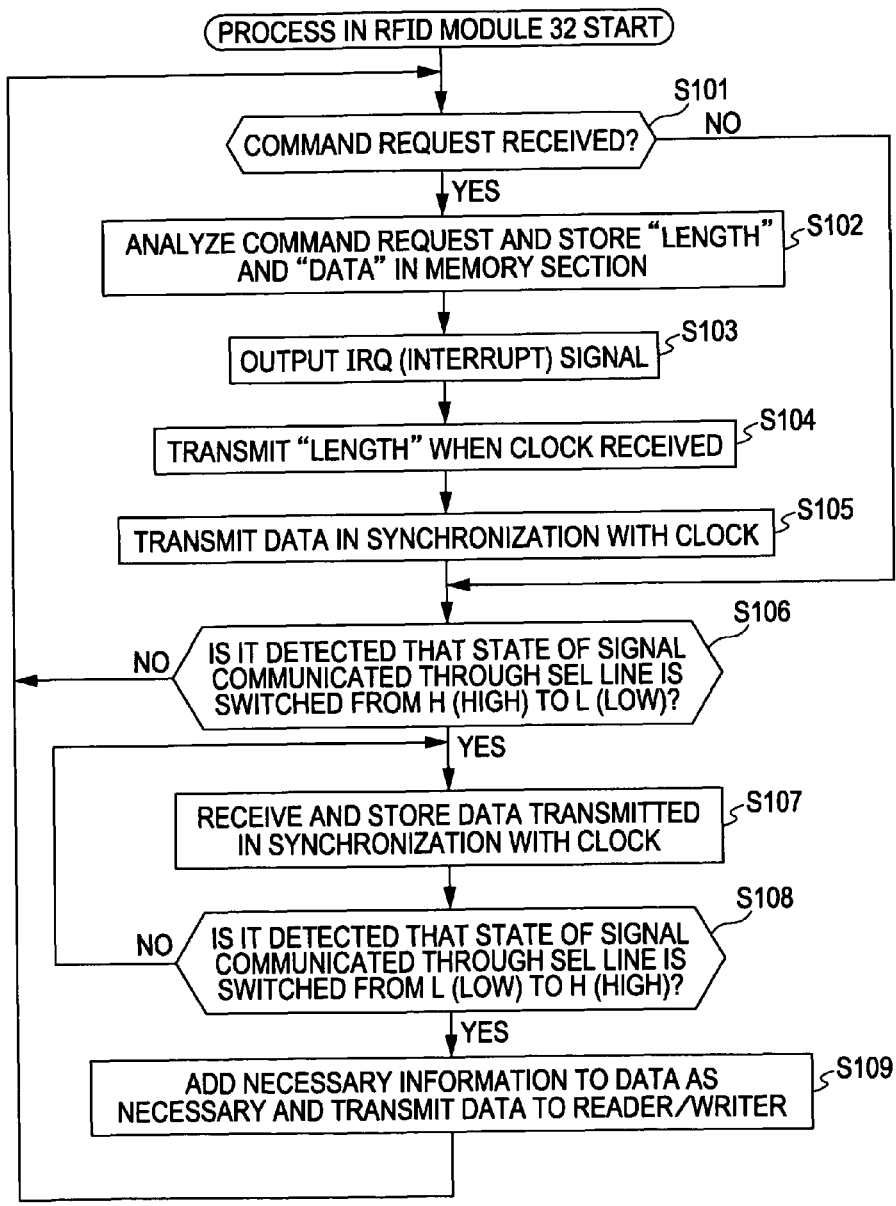
FIG. 8 is a flowchart illustrating the process performed in an RFID module.

Next, the RFID module 32 being focused on, a process relating to the above-mentioned communication the RFID module 32 performs will be described. FIG. 8 is a flowchart illustrating the process in the RFID module 32.

In Step S101, the RFID module 32 determines whether or not a command request is received from the reader/writer 11. In this case, it is supposed that a trigger starting data communication from the RFID module 32 to the host CPU 34 is reception of the command request from the reader/writer 11. Therefore, descriptions, as below, relating to the process is based on the above condition that, in Step S101, the RFID module 32 determines whether or not the command request is received from the reader/writer 11. However, since other trigger may be adopted, the process in Step S101 is a process in which occurrence of such a trigger is determined.

When in Step S101 the RFID module 32 determines that the command request is received from the reader/writer 11, the process proceeds to Step S102. In Step S102, the received polling command is analyzed, and "Length" and "DATA" as an analysis result are stored in the memory section 33 as necessary. Namely, as described with reference to FIG. 3, the command request 71 including the data 72 to the data 75 is received and a command code included in the data 73 is analyzed. Then, in response to the analysis result, the "Length" included in the data 72 and the "DATA" included in the data 74 are stored in the memory section 33.

In addition, while the RFID module 32 does not analyze a command in communication between the RFID module 32 and the host CPU 34, the RFID module 32 analyzes a command from the reader/writer 11 in communication between the RFID module 32 and the reader/writer 11. The RFID module 32 analyzes the command from the reader/writer 11 and, in response to the analysis result, the RFID module 32 may perform communication between the RFID module 32 and the host CPU 34.

In addition the RFID module 32 may simply transfer the command from the reader/writer 11 to the host CPU 34 while the RFID module 32 does not analyze the command from the reader/writer 11.

While the analysis and the storing are performed, in Step S103 the RFID module 32 outputs an IRQ signal (an interrupt signal) to the host CPU 34 through the IRQ line 44. Then, when the host CPU 34 starts supplying a clock signal through the CLK line 41 in response to the interrupt signal, the RFID module 32 outputs the "Length" in Step S104. For example, the RFID module 32 supplies the data length of a command as the "Length" to the host CPU 34, the data length being stored in the memory section 33.

After the "Length" is output, in Step S105 the RFID module 32 transmits data, which is to be supplied to the host CPU 34, through the DATA line 42, the data being in synchronization with the supplied clock signal. Namely, data including the data 72 and the data 74 as shown in FIG. 3B is transmitted from the RFID module 32 to the host CPU 34. Since the RFID module 32 transmits data with no determination of whether or not data transmission is terminated, the RFID module 32 may proceed to a next process after data transmission is terminated.

After the data transmission is terminated or when, in Step S101, it is determined that no command request is received, the process proceeds to Step S106. The process from Step S101 through Step S105 as described above is a process in which the first patter is realized.

In Step S106, the RFID module 32 determines whether or not it is detected that the state of the signal communicated through the SEL line 43 is switched from H (High) to L (Low). When in Step S106 the RFID module 32 determines that it is not detected that the state of the signal communicated through the SEL line 43 is switched from H (High) to L (Low), the process returns to Step S101 and the following process is repeated. On the other hand, when in Step S106 the RFID module 32 determines that it is detected that the state of the signal communicated through the SEL line 43 is switched from H (High) to L (Low), the process proceeds to Step S107.

In Step S107, data transmitted from the host CPU 34 in synchronization with the clock signal (for example, the data 81 shown in FIG. 3C) is received and stored in the memory section 33 as necessary. In Step S108, the RFID module 32 determines whether or not it is detected that the state of the signal communicated through the SEL line 43 is switched from L (Low) to H (High). When in Step S108 the RFID module 32 determines that it is not detected that the state of the signal communicated through the SEL line 43 is switched from L (Low) to H (High), that is, when the host CPU 34 are transmitting data, the process returns to Step S107 and reception and storing of data are continued.

On the other hand, when in Step S108 the RFID module 32 determines that it is detected that the state of the signal communicated through the SEL line 43 is switched from L (Low) to H (High), the process proceeds to Step S109. In this state, since data-transmission from the host CPU 34 is terminated, the RFID module 32 adds necessary information to the data stored in the memory section 33 and transmits the data to the reader/writer 11. Namely, as shown in FIG. 3D, the data 83 (the "Length"), the data 84 (a command code), and the data 85 (CRC) are appended to the data 81 transmitted from the host CPU 34, and the command response 82 is generated and transmitted to the reader/writer 11.

The process from Step S106 through Step S109 is a process in which the above-mentioned second patter is realized. In addition, the process in which Steps S101 to S109 are performed is a process in which the above-mentioned third patter is performed. In addition, the process in which Steps S106 to S109 are performed and, after that, Steps S101 to 5105 are performed is a process in which the above-mentioned fourth patter is performed.

Process in Host CPU 34

Figure 9:
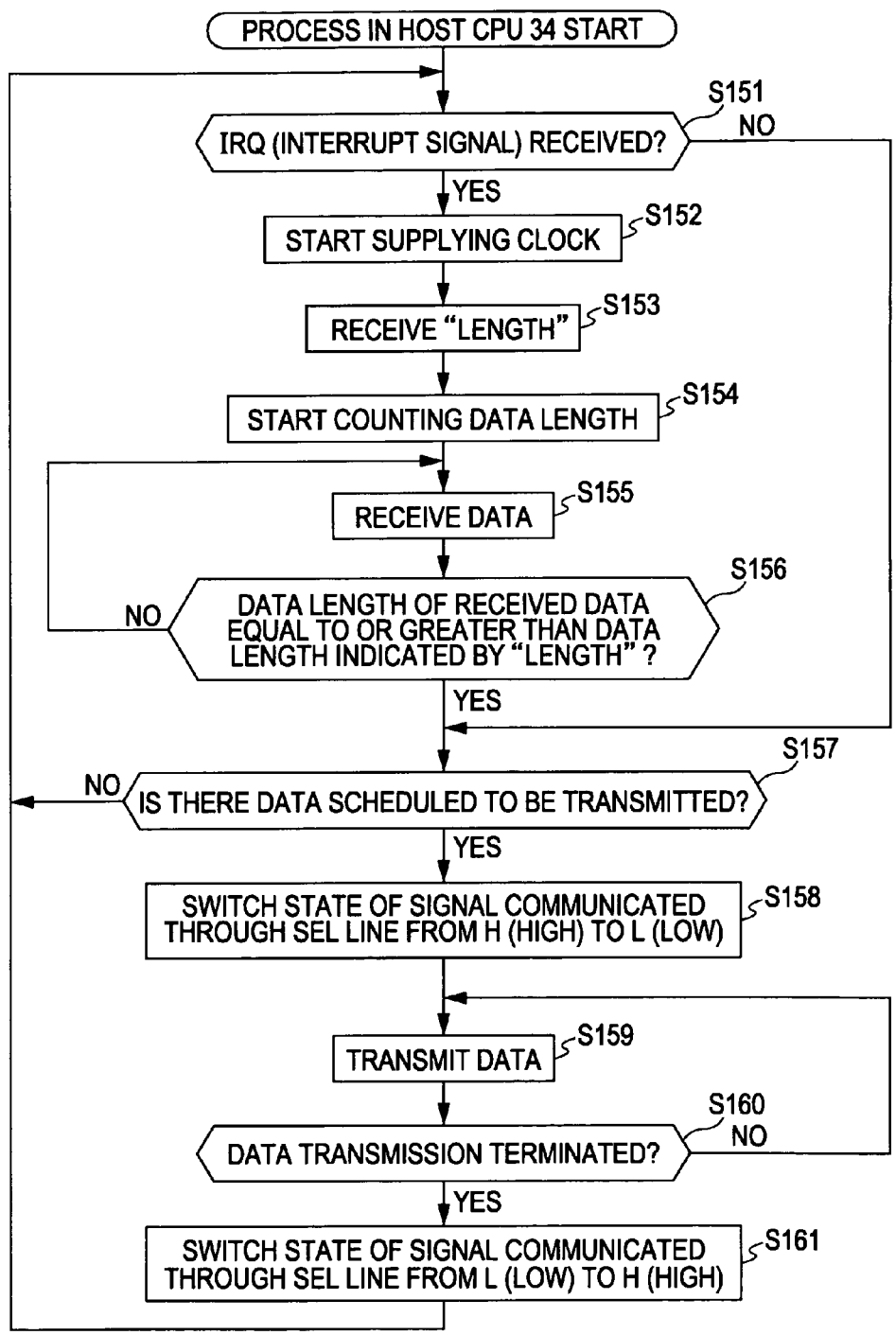
FIG. 9 is a flowchart illustrating the process performed in a host CPU.

Next, corresponding to the process in the RFID module 32 described with reference to the flowchart shown in FIG. 8, a process performed in the host CPU 34 will be described with reference to a flowchart shown in FIG. 9.

At the start of the process in the host CPU 32, the host CPU 32 sets the state of a signal communicated through the SEL line 43 to L (Low).

In Step S151, the host CPU 34 determines whether or not an IRQ signal (an interrupt signal) is received from the RFID module 32 through the IRQ line 44. When in Step S151 the IRQ signal is determined to be received, the process proceeds to Step S152. On the other hand, when the IRQ signal is not determined to be received, the process proceeds to Step S157.

In Step S152, the host CPU 34 starts supplying a clock signal through the CLK line 41 when the host CPU 34 is ready for receiving data transmitted from the RFID module 32. If the clock signal is supplied to the RFID module 32, data corresponding to "Length", which is transmitted from the RFID module 32, is received in Step S153 in response to the clock signal. When the data corresponding to the "Length" is received, in Step S154 the host CPU starts counting the data length of the received data.

In Step S155, data transmitted from the RFID module 32 through the DATA line 42 is received. Every time the data is received, the data length of the received data is counted. Then, in Step S156, the host CPU determines whether or not the data length of the received data, that is, the counted data length is equal to or greater than data length indicated by the "Length".

When in Step S156 the counted data length is determined to be smaller than data length indicated by the "Length", that is, the RFID module 32 is transmitting data, the process returns to S155 and data reception is continued.

On the other hand, when in Step S156 the counted data length is determined to be equal to or greater than data length indicated by the "Length", that is, data transmission from the RFID module 32 is terminated, the process proceeds to S157.

The process from Step S151 through Step S156 is a process in which the above-mentioned first patter is realized.

In Step S157, the host CPU 34 determined whether or not data is scheduled to be transmitted to the RFID module 32. When in Step S157 it is determined that data is scheduled to be transmitted to the RFID module 32, the process proceeds to Step S158. When it is determined that data is not scheduled to be transmitted to the RFID module 32, the process returns to Step S151 and the following process is repeated.

In Step S158, the host CPU 34 switches the state of the signal communicated through the SEL line 43 from H (high) to L (Low) so as to notify the RFID module 32 that data is scheduled to be transmitted. In this way, the state of the signal communicated through the SEL line 43 being switched, the state that the RFID module 32 can receive data is set. In addition to the state, when the host CPU 34 is ready for transmitting data, the process proceeds to Step S159.

In Step S159, the host CPU 34 transmits data to the RFID module 32 through the DATA line 42. In addition, when the clock signal is not supplied to the RFID module 32 through the CLK line 41, supply of the clock signal starts before data transmission is performed.

In Step S160, the host CPU 34 determines whether or not data transmission is terminated. When data transmission is not determined to be terminated, the process returns to Step S159 and data transmission to the RFID module 32 is continued. On the other hand, when in Step S160 data transmission is determined to be terminated, the process proceeds to Step S161.

In Step S161, the host CPU 34 returns the state of the signal communicated through the SEL line 43 from L (Low) to H (High). In this way, the state of the signal communicated through the SEL line 43 being switched, the RFID module 32 detects the termination of data transmission and proceeds to a following process.

The process from Step S157 through Step S161 is a process in which the above-mentioned second patter is realized. In addition, the process in which Steps S151 to S161 are performed is a process in which the above-mentioned third patter is performed. In addition, the process in which Steps S157 to S161 are performed and, after that, Steps S151 to S156 are performed is a process in which the above-mentioned fourth patter is performed.

Since data communication between the RFID module and the host CPU 34 is performed in this way, the data length of data transmitted therebetween is reduced. Therefore, a processing load relating to data transmission is reduced.

In addition, since the data transmitted between the RFID module and the host CPU 34 does not include a command, a function for generating or analyzing the command may be unnecessary and the size of a circuit or memory size may be reduced. Furthermore, since such a function may be unnecessary in communication between the RFID module and the host CPU 34, no processing load may be necessary for analyzing the command. Therefore, overall processing load may be reduced and, as a result, power consumption may be reduced.

In addition, while, as an example, data communication between the RFID module and the host CPU 34 is described in the above-mentioned embodiment, the application of the present invention is not restricted to such a data communication. In other words, while, as an example of communication system with a serial interface, RFID is described in the above-mentioned embodiment, the present invention can be applied to a communication system other than RFID.

Recording Medium

The above-mentioned series of process may be performed with hardware or software. When the series of process is performed with software, a program including the software is installed to a computer. In this case, the computer represents a computer embedded in a dedicated hardware and a computer, such as a universal personal computer, capable of executing various kinds of functions by installing various kinds of programs.

Figure 10:
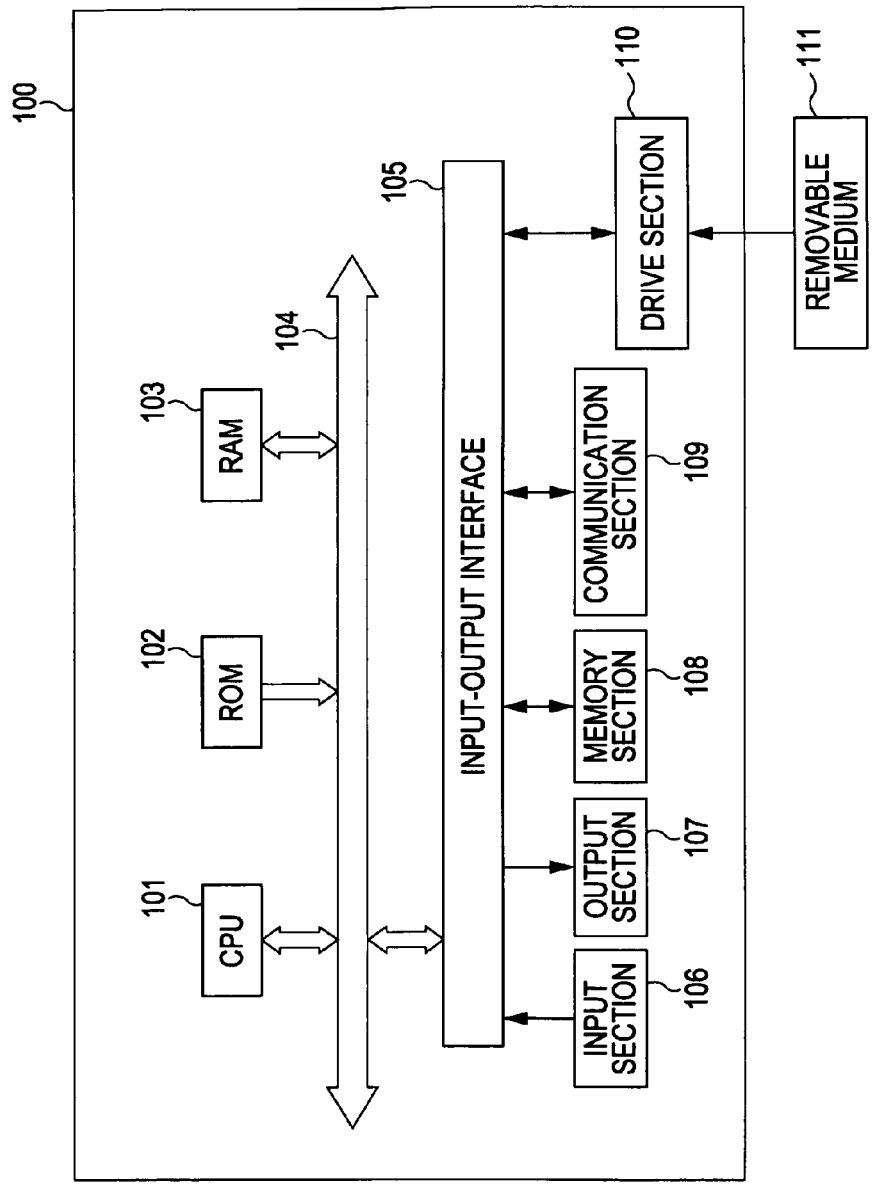
FIG. 10 is a diagram illustrating a recording medium.

FIG. 10 is a block diagram illustrating a hardware configuration example of a computer performing the above-mentioned series of process with a program.

In the computer, a CPU 101, a ROM (Read Only Memory) 102, and a RAM (Random Access Memory) 103 are connected with one another through a bus 104. Furthermore, an input-output interface 105 is connected to the bus 104. An input section 106, an output section 107, a memory section 108, a communication section 109, and a drive section 110 are connected to the input-output interface 105.

The input section 106 includes a keyboard, a mouse, and a microphone. The output section 107 includes a display and a speaker. The memory section 108 includes a hard disk drive and a nonvolatile memory. The communication section 109 includes a network interface. The drive section 110 drives a removable medium 111 such as a magnetic disk, an optical disk, a magnet-optical disk, and a semiconductor memory.

In the computer with the above-mentioned configuration, the CPU 101 loads a program, for example, stored in the memory section 108 into the RAM 103 through the input-output interface 105 and the bus 104 and performs the above-mentioned series of process.

For example, a program executed by the computer (the CPU 101) may be recorded in the removable medium 111 as a package medium and be provided. In addition, the program may be provided through a wire or wireless transmission medium such as local area network, internet, or Digital Satellite Broadcasting.

In the computer, by attaching the removable medium 111 to the drive section 110, the program may be installed to the memory section 108 through the input-output interface 105. In addition, the program may be received through a wire or wireless transmission medium and installed to the memory section 108. Furthermore, the program may be installed to the ROM 102 or the memory section 108 in advance.

Then, the program executed by the computer may be a program processed in temporal sequence along the order described in the specification, a program processed in parallel, or a program processed at necessary timing when a program call is executed.

In addition, in the specification, a system represents a whole apparatus including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information-processing apparatus, comprising:
   communication means configured to communicate with a reader/writer;
   a module configured to control the communication means;
   a processing means configured to transmit and receive data to and from the module, respectively;
   an interrupt-signal output means configured to generate output of an interrupt signal from the module to the processing means when the communication means receives data from the reader/writer;

a clock-signal output means configured to generate output of a clock signal from the processing means to the module when the interrupt signal is received;

a data output means configured to generate output of data, in synchronization with the clock signal, from the module to the processing means or from the processing means to the module; and a switching-signal output means through which the processing means outputs a switching signal used for switching the direction of data transmission and reception;

wherein output data transmitted from the reader/writer for receipt by the module by way of the communication means includes data-length data, command data, and main data, in which the data-length data indicates a data length of the main data to be transmitted to the processing means, wherein upon receipt of the output data the module analyzes the command data and (i) when a result of the analysis indicates that the main data should be supplied to the processing means the module supplies the data-length data and the main data to the processing means and does not supply the command data to the processing means and (ii) when the result of the analysis indicates that the main data should not be supplied to the processing means the module does not supply the main data to the processing means, wherein the module outputs the interrupt signal, and transmits the data-length data when the clock signal is received; and the processing means counts the data length of the main data, after the data-length data indicating the data length is received, and determines the termination of the data output from the module when the count value is equal to or greater than the data length indicated by the data-length data, and the module detects that data is transmitted from the processing means or detects that data transmission from the processing means is terminated based on a changeover in a state of the switching signal.

2. The information-processing apparatus according to claim 1, wherein the communication means receives a polling request from the reader/writer and transmits a polling response from the module to the reader/writer in response to receiving the polling request, the data being transmitted by the reader/writer in response to receiving the polling response.

3. An information-processing apparatus, comprising:

a first line, included in a predetermined interface, for transmitting an interrupt signal to a second apparatus, connected using the interface, when data is received from a first apparatus;

a second line, included in the interface, for receiving a clock signal from the second apparatus;

a third line, included in the interface, for transmitting and receiving data between the information-processing apparatus and the second apparatus; and a fourth line, included in the interface, for receiving a signal from the second apparatus, the signal indicating whether data is to be transmitted to or received from the second apparatus, wherein based on a changeover of the signal transmitted through the fourth line, it is detected that data is to be transmitted from the second apparatus or data transmission therefrom is terminated, wherein the data from the first apparatus includes data-length data, command data, and main data, in which the data-length data indicates a data length of the main data to be transmitted to the second apparatus, wherein upon receipt of the data the information-processing apparatus analyzes the command data and (i) when a result of the analysis indicates that the main data should be supplied to the second apparatus the information-processing apparatus supplies the data-length data and the main data to the second apparatus and does not supply the command data to the second apparatus and (ii) when the result of the analysis indicates that the main data should not be supplied to the second apparatus the information-processing apparatus does not supply the main data to the second apparatus.

4. The information-processing apparatus according to claim 3, wherein the clock signal is received from the second apparatus through the second line after the interrupt signal is transmitted to the second apparatus through the first line; and the data length of data is transmitted to the second apparatus through the third line after the clock signal is received, the data being transmitted to the second apparatus through the third line in synchronization with the clock signal.

5. A non-transitory computer readable recording medium having stored thereon a computer readable program configured to cause an information-processing apparatus to execute processing for performing wireless communication with a first apparatus and wire communication with a second apparatus, the processing comprising:

transmitting an interrupt signal to the second apparatus using the wire communication when data is received from the first apparatus;

receiving, using the wire communication, a clock signal from the second apparatus which receives the interrupt signal;

transmitting and receiving, using the wire communication, data between the information-processing apparatus and the second apparatus;

receiving a signal from the second apparatus, the signal indicating whether data is to be transmitted to or received from the second apparatus; and detecting, based on a changeover of the signal transmitted, that data is to be transmitted from the second apparatus or that data transmission therefrom is terminated, wherein the data from the first apparatus includes data-length data, command data, and main data, in which the data-length data indicates a data length of the main data to be transmitted to the second apparatus, wherein upon receipt of the data the information-processing apparatus analyzes the command data and (i) when a result of the analysis indicates that the main data should be supplied to the second apparatus the information-processing apparatus supplies the data-length data and the main data to the second apparatus and does not supply the command data to the second apparatus and (ii) when the result of the analysis indicates that the main data should not be supplied to the second apparatus the information-processing apparatus does not supply the main data to the second apparatus.

6. An information-processing apparatus, comprising:

a first line, included in a predetermined interface, for receiving an interrupt signal from a second apparatus, connected using the interface, when the second apparatus receives data from a first apparatus;

a second line, included in the interface, for transmitting a clock signal to the second apparatus;

a third line, included in the interface, for transmitting and receiving data between the information-processing apparatus and the second apparatus; and a fourth line, included in the interface, for transmitting a signal to the second apparatus, the signal indicating whether data is to be transmitted to or received from the second apparatus, wherein on based on a changeover in a state of the signal transmitted through the fourth line, it is detected that data is to be transmitted to the second apparatus or data transmission thereto is terminated, wherein the data from the first apparatus includes data-length data, command data, and main data, in which the data-length data indicates a data length of the main data to be transmitted to the second apparatus, wherein upon receipt of the data the second apparatus analyzes the command data and (i) when a result of the analysis indicates that the main data should be supplied to the information-processing apparatus the second apparatus supplies the data-length data and the main data to the information-processing apparatus and does not supply the command data to the information-processing apparatus and (ii) when the result of the analysis indicates that the main data should not be supplied to the information-processing apparatus the second apparatus does not supply the main data to the information-processing apparatus.

7. The information-processing apparatus according to claim 6, wherein the clock signal is transmitted to the second apparatus through the second line after the interrupt signal is received from the second apparatus through the first line; the data-length data is received from the second apparatus through the third line after the clock signal is transmitted, the latter data being transmitted from the second apparatus through the third line in synchronization with the clock signal; and the data length of data, the data being transmitted from the second apparatus, is counted after the data-length data is received, and the termination of data transmission from the second apparatus is determined when the count value is equal to or greater than the data length indicated by the received data-length data.

8. A non-transitory computer readable recording medium having stored thereon a computer readable program configured to cause an information-processing apparatus to execute processing for performing wireless communication with a first apparatus and wire communication with a second apparatus, the processing comprising:

receiving an interrupt signal at the second apparatus using the wire communication when the information-processing apparatus receives data from the first apparatus;

transmitting, using the wire communication, a clock signal to the information-processing apparatus when the interrupt signal is received;

transmitting and receiving, using the wire communication, data between the information-processing apparatus and the second apparatus;

receiving a signal from the second apparatus, the signal indicating whether data is to be transmitted to or received from the second apparatus; and detecting, based on a changeover of the signal transmitted, that data is to be transmitted from the second apparatus or that data transmission therefrom is terminated, wherein the data from the first apparatus includes data-length data, command data, and main data, in which the data-length data indicates a data length of the main data to be transmitted to the second apparatus, wherein upon receipt of the data the second apparatus analyzes the command data and (i) when a result of the analysis indicates that the main data should be supplied to the information-processing apparatus the second apparatus supplies the data-length data and the main data to the information-processing apparatus and does not supply the command data to the information-processing apparatus and (ii) when the result of the analysis indicates that the main data should not be supplied to the information-processing apparatus the second apparatus does not supply the main data to the information-processing apparatus.

9. An information-processing apparatus, comprising:

a communication unit configured to communicate with a reader/writer;

a module configured to control the communication unit;

a processing unit configured to transmit and receive data to and from the module, respectively;

an interrupt-signal output unit configured to generate output of an interrupt signal from the module to the processing unit when the communication unit receives data from the reader/writer;

a clock-signal output unit configured to generate output of a clock signal from the processing unit to the module when the interrupt signal is received;

a data output unit configured to generate output of data, in synchronization with the clock signal, from the module to the processing unit or from the processing unit to the module; and a switching-signal output unit through which the processing unit outputs a switching signal used for switching the direction of data transmission and reception;

wherein output data transmitted from the reader/writer for receipt by the module by way of the communication unit includes data-length data, command data, and main data, in which the data-length data indicates a data length of the main data to be transmitted to the processing unit, wherein upon receipt of the output data the module analyzes the command data and (i) when a result of the analysis indicates that the main data should be supplied to the processing unit the module supplies the data-length data and the main data to the processing unit and does not supply the command data to the processing unit and (ii) when the result of the analysis indicates that the main data should not be supplied to the processing unit the module does not supply the main data to the processing unit, wherein the module outputs the interrupt signal, and transmits the data-length data when the clock signal is received; and the processing unit counts the data length of the main data, after the data-length data indicating the data length is received, and determines the termination of data output from the module when the count value is equal to or greater than the data length indicated by the data-length data, and the module detects that data is transmitted from the processing unit or detects that data transmission from the processing unit is terminated based on a changeover in a state of the switching signal.

* * * * *